US012613979B2

(12) United States Patent
Lee et al.

(10) Patent No.: US 12,613,979 B2
(45) Date of Patent: Apr. 28, 2026

(54) ELECTRONIC DEVICE FOR PERFORMING BLOCK CONSENSUS ON BASIS OF BLOCKCHAIN, AND OPERATION METHOD THEREFOR

(71) Applicant: SAMSUNG ELECTRONICS CO., LTD., Suwon-si (KR)

(72) Inventors: Kyehwan Lee, Suwon-si (KR); Youna Lee, Suwon-si (KR); Sungjin Park, Suwon-si (KR); Wooseok Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 88 days.

(21) Appl. No.: 18/375,782

(22) Filed: Oct. 2, 2023

(65) Prior Publication Data

US 2024/0028751 A1 Jan. 25, 2024

Related U.S. Application Data

(63) Continuation of application No. PCT/KR2022/004736, filed on Apr. 1, 2022.

(30) Foreign Application Priority Data

Apr. 2, 2021 (KR) ........................ 10-2021-0043256

(51) Int. Cl.
*G06F 21/60* (2013.01)
*G06F 11/30* (2006.01)
(Continued)

(52) U.S. Cl.
CPC ........ *G06F 21/602* (2013.01); *G06F 11/3006* (2013.01); *G06F 11/3409* (2013.01); *G06F 21/6227* (2013.01)

(58) Field of Classification Search
CPC .............. G06F 21/602; G06F 11/3006; G06F 11/3409; G06F 21/6227; G06F 11/3003;
(Continued)

(56) References Cited

U.S. PATENT DOCUMENTS 10,706,023 B2 7/2020 Wang
10,722,649 B2 * 7/2020 Tang ................... G06F 16/2379
(Continued)

FOREIGN PATENT DOCUMENTS

CN 112600917 A 4/2021
KR 102208186 B1 * 3/2018
(Continued)

OTHER PUBLICATIONS

Communication dated Jul. 22, 2022, issued by the International Searching Authority in counterpart International Application No. PCT/KR2022/004736 (PCT/ISA/210).
(Continued)

*Primary Examiner* — Anh Nguyen
(74) *Attorney, Agent, or Firm* — Sughrue Mion, PLLC

(57) ABSTRACT

Provided is an electronic device for performing block consensus. The electronic device is configured to query at least one external electronic device configuring a decentralization network whether to participate in consensus, receive a consensus participation response to the query from at least one first external electronic device among the at least one external electronic device, identify a specified number of second external electronic devices among the at least one first external electronic device, based on the consensus participation response, and transmit a consensus request to the specified number of second external electronic devices.

18 Claims, 8 Drawing Sheets

(51) Int. Cl.
*G06F 11/34* (2006.01)
*G06F 21/62* (2013.01)
(58) Field of Classification Search
CPC . H04L 65/40; H04L 67/1061; H04L 67/1087;
H04L 67/1068; H04L 67/1093
See application file for complete search history.

(56) References Cited

U.S. PATENT DOCUMENTS

| | | | | |
|---|---|---|---|---|
| 10,785,039 | B2 | 9/2020 | Wu | |
| 10,797,886 | B2 | 10/2020 | Wu | |
| 11,044,103 | B2 | 6/2021 | Tang | |
| 11,126,596 | B2 | 9/2021 | Wang | |
| 11,521,176 | B2 | 12/2022 | Song et al. | |
| 11,769,172 | B2 | 9/2023 | Chhipa et al. | |
| 2017/0236120 | A1* | 8/2017 | Herlihy | G06Q 20/065 |
| | | | | 705/67 |
| 2019/0034459 | A1 | 1/2019 | Qiu | |
| 2019/0384748 | A1 | 12/2019 | Roennow et al. | |
| 2019/0386995 | A1* | 12/2019 | Chafe | G06Q 20/065 |
| 2020/0026699 | A1 | 1/2020 | Zhang et al. | |
| 2020/0027089 | A1* | 1/2020 | Kuchar | H04L 9/0637 |
| 2020/0089690 | A1 | 3/2020 | Qiu | |
| 2022/0005072 | A1* | 1/2022 | Chhipa | G06Q 30/0255 |
| 2022/0239496 | A1 | 7/2022 | Shao et al. | |

FOREIGN PATENT DOCUMENTS

| | | | |
|---|---|---|---|
| KR | 10-2050153 | B1 | 11/2019 |
| KR | 10-2089853 | B1 | 4/2020 |
| KR | 10-2020-0074911 | A | 6/2020 |
| KR | 10-2020-0100472 | A | 8/2020 |
| KR | 10-2020-0101020 | A | 8/2020 |
| KR | 10-2140414 | B1 | 8/2020 |
| KR | 10-2020-0144466 | A | 12/2020 |
| KR | 10-2192885 | B1 | 12/2020 |
| KR | 10-2201235 | B1 | 1/2021 |
| KR | 10-2208411 | B1 | 1/2021 |
| KR | 10-2022-0006623 | A | 1/2022 |
| WO | 2020/080874 | A1 | 4/2020 |

OTHER PUBLICATIONS

Communication dated Jul. 22, 2022, issued by the International Searching Authority in counterpart International Application No. PCT/KR2022/004736 (PCT/ISA/237).
Office Action issued May 31, 2025 by the Korean Patent Office for KR Patent Application No. 10-2021-0043256.
Communication dated Jan. 23, 2026, issued by the Korean Ministry of Intellectual Property in Korean Application No. 10-2021-0043256.

* cited by examiner

100

500

| Points | STRENGTH OF RECEIVED SIGNAL (6) | SERVICE ON TIME (5) | CPU PERFORMANCE (4) | REMAINING BATTERY CAPACITY (3) | MEMORY CAPACITY (2) | TRANSACTION CONSENSUS PARTICIPATION HISTORY (1) |
|---|---|---|---|---|---|---|
| 5 | -120 OR MORE | 5 YEARS (60 MONTHS) OR MORE | 20 GHz OR MORE | 4000 OR MORE | 16 GB OR MORE | 10 TIMES OR LESS |
| 4 | -110 OR MORE | 4 YEARS (48 MONTHS) OR MORE | 15 GHz OR MORE | 3500 OR MORE | 12 GB OR MORE | 20 TIMES OR LESS |
| 3 | -100 OR MORE | 3 YEARS (36 MONTHS) OR MORE | 10 GHz OR MORE | 3000 OR MORE | 8 GB OR MORE | 30 TIMES OR LESS |
| 2 | -90 OR MORE | 2 YEARS (24 MONTHS) OR MORE | 5 GHz OR MORE | 2500 OR MORE | 4 GB OR MORE | 40 TIMES OR LESS |
| 1 | -80 OR MORE | 1 YEAR (12 MONTHS) OR MORE | 2 GHz OR MORE | 2000 OR MORE | 2 GB OR MORE | 50 TIMES OR LESS |
| 0 | -80 OR MORE | LESS THAN 1 YEAR | 2 GHz OR MORE | 1500 OR MORE | 2 GB OR MORE | GREATER THAN 50 TIMES |

FIG.5

ELECTRONIC DEVICE FOR PERFORMING BLOCK CONSENSUS ON BASIS OF BLOCKCHAIN, AND OPERATION METHOD THEREFOR

CROSS-REFERENCE TO RELATED APPLICATIONS

This application is a bypass continuation of PCT International Application No. PCT/KR2022/004736, which was filed on Apr. 1, 2022, and claims priority to Korean Patent Application No. 10-2021-0043256, filed on Apr. 2, 2021, in the Korean Intellectual Property Office, the disclosures of which are incorporated herein by reference in their entireties.

BACKGROUND

1. Field

The disclosure relates to an electronic device for performing block consensus based on a blockchain and an operation method thereof.

2. Description of Related Art

A blockchain technology may is a technology for allowing a plurality of nodes to share a ledger and record a block generated through a calculation process of the nodes in the ledger based on various consensus mechanisms to facilitate decentralization of data and information.

Because the ledger is updated based on the various consensus mechanisms and is shared by the plurality of nodes, it is impossible for data recorded once in the ledger to be forged or falsified.

Furthermore, because the plurality of nodes store the ledger, all transactions recorded in the ledger are open to anyone.

A network where the blockchain technology is implemented may be referred to as a decentralization network. The decentralization network may include an electronic device (e.g., a portable terminal) with high mobility. The portable terminal may operate as a node in the decentralization network.

Because a decentralization network based on a portable terminal is more lowered in computational ability of each node than a decentralization network based on a server, it may have a slow speed at which a transaction and/or a block is generated. Furthermore, because the number of nodes is vast in the decentralization network based on the portable terminal, it may be difficult for the decentralization network based on the portable terminal to make a consensus about the transaction by means of all the nodes.

SUMMARY

Provided are an electronic device and method for performing block consensus based on a blockchain. According to one or more embodiments of the disclosure, the electronic device may make a consensus about a transaction using some nodes identified as consensus participation nodes among a plurality of nodes included in a decentralization network, thus increasing a speed at which the transaction and/or a block is generated.

According to an aspect of an embodiment, an electronic device, includes: a wireless communication circuit; memory storing at least one instruction; at least one processor configured to execute the at least one instruction to: query at least one external electronic device configuring a decentralization network whether to participate in consensus, receive a consensus participation response to the query from at least one first external electronic device among the at least one external electronic device, identify a specified number of second external electronic devices among the at least one first external electronic device, based on the consensus participation response, and transmit a consensus request to the specified number of second external electronic devices.

The query may include a specified condition associated with state information of the at least one external electronic device, and the at least one first external electronic devices participate in the consensus based on whether the specified condition is met.

The state information may be based on at least one of a performance index or a stability index of each of the at least one external electronic device.

The performance index may include at least one of strength of a received signal, CPU performance, memory capacity, or a packet Internet groper (ping) time, and the stability index may include at least one of a service on time, remaining battery capacity, or a transaction consensus participation history.

The specified condition may include that a consensus participation score calculated based on the state information is greater than or equal to a reference value.

The specified condition may include that at least one index included in the performance index and the stability index is within a reference range.

The at least one processor may be further configured to execute the at least one instruction to: change the specified condition and query the at least one external electronic device again whether to participate in the consensus, based on a number of the at least one first external electronic device being less than the specified number.

The at least one processor may be further configured to execute the at least one instruction to: identify the specified number of second external electronic devices, based on at least one of the state information or an arrival time of the consensus participation response, based on a number of the at least one first external electronic device being greater than the specified number.

The specified number may be determined based on a consensus algorithm.

The consensus algorithm may include at least one of a proof of stake (PoS), a proof of work (PoW), a delegated proof of stake (DPoS), or practical byzantine fault tolerance (PBFT).

According to an aspect of an embodiment, a method of operating an electronic device, includes: querying at least one external electronic device configuring a decentralization network whether to participate in consensus; receiving a consensus participation response to the query from at least one first external electronic device among the at least one external electronic device; identifying a specified number of second external electronic devices among the at least one first external electronic device, based on the consensus participation response; and transmitting a consensus request to the specified number of second external electronic devices.

The query may include a specified condition associated with state information of the at least one external electronic device, and the at least one first external electronic device participates in the consensus based on whether the specified condition is met.

The state information may be based on at least one of a performance index or a stability index of each of the at least one external electronic device.

The performance index may include at least one of strength of a received signal, CPU performance, memory capacity, or a packet Internet groper (ping) time, and the stability index may include at least one of a service on time, remaining battery capacity, or a transaction consensus participation history.

The specified condition may include that a consensus participation score calculated based on the state information is greater than or equal to a reference value.

The specified condition may include that at least one index included in the performance index and the stability index is within a reference range.

The method may further include: changing the specified condition and querying the at least one external electronic device again whether to participate in the consensus, based on a number of the at least one first external electronic device being less than the specified number.

The method may further include: identifying the specified number of second external electronic devices, based on at least one of the state information or an arrival time of the consensus participation response, based on a number of the at least one first external electronic device being greater than the specified number.

The specified number may be determined based on a consensus algorithm.

The consensus algorithm may include at least one of a proof of stake (PoS), a proof of work (PoW), a delegated proof of stake (DPoS), or practical byzantine fault tolerance (PBFT).

According to an aspect of an embodiment, a non-transitory computer readable medium stores computer readable program code or instructions which are executable by a processor to perform a method for block consensus. The method includes: querying at least one external electronic device configuring a decentralization network whether to participate in consensus; receiving a consensus participation response to the query from at least one first external electronic device among the at least one external electronic device; identifying a specified number of second external electronic devices among the at least one first external electronic device, based on the consensus participation response; and transmitting a consensus request to the specified number of second external electronic devices.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates a consensus participation score calculation table according to one or more embodiments;

DETAILED DESCRIPTION

Figure 1:
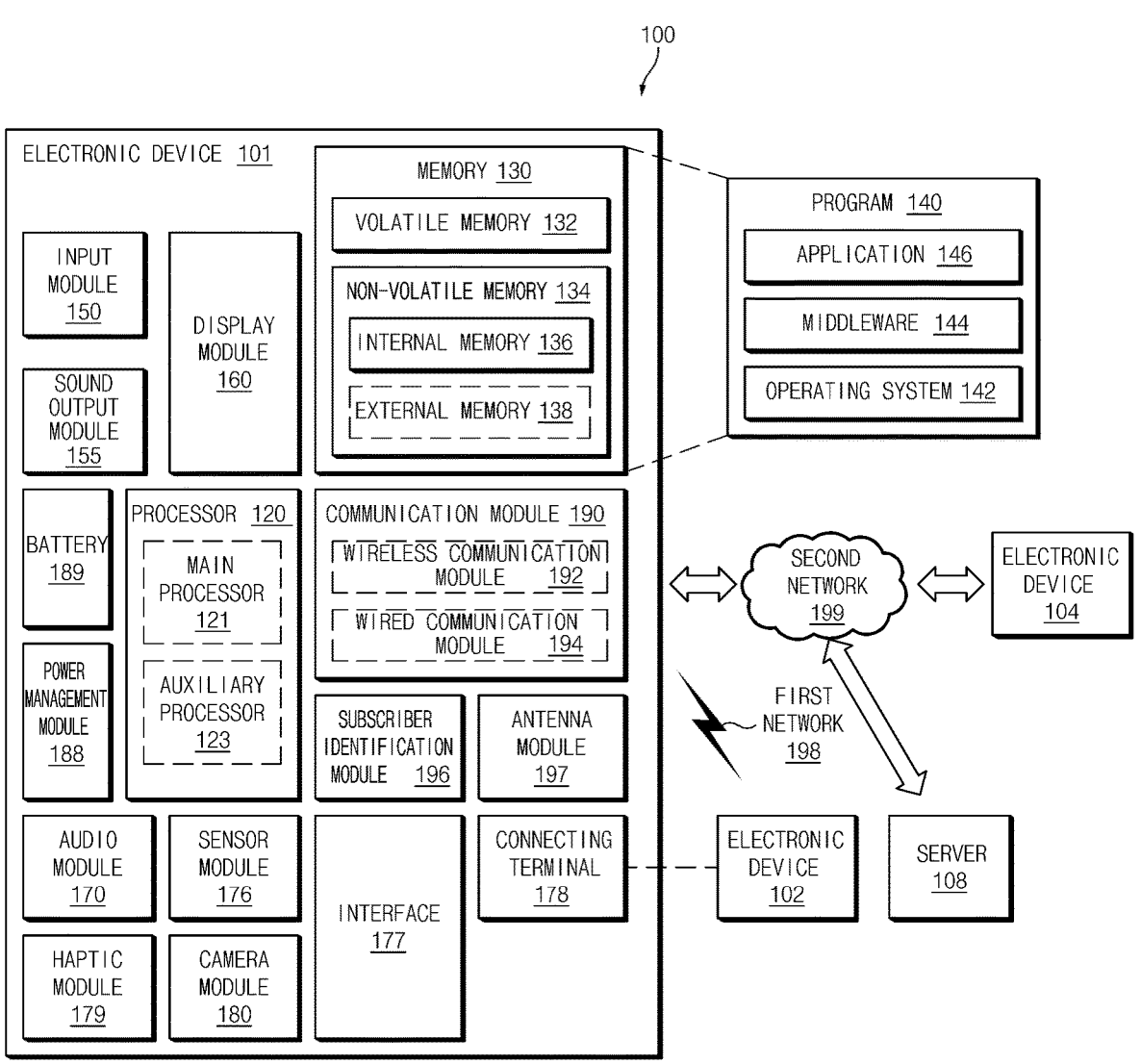
FIG. 1 is a block diagram illustrating an electronic device in a network environment according to one or more embodiments.

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
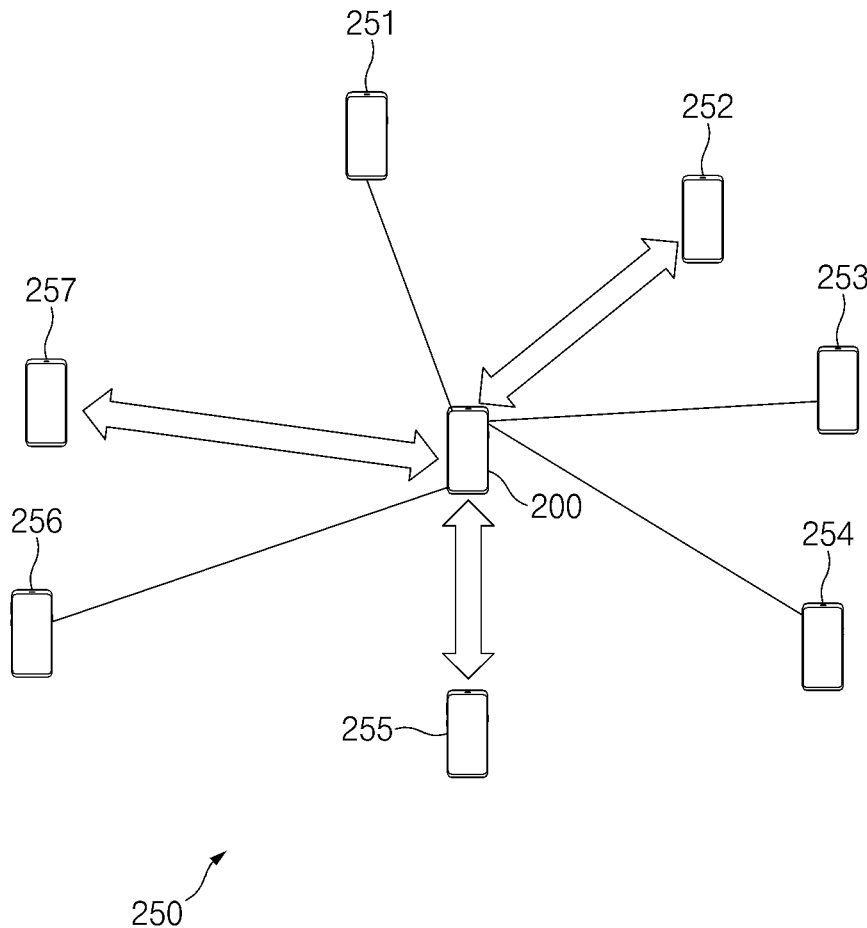
FIG. 2 illustrates a decentralization network according to one or more embodiments.
Figure 3:
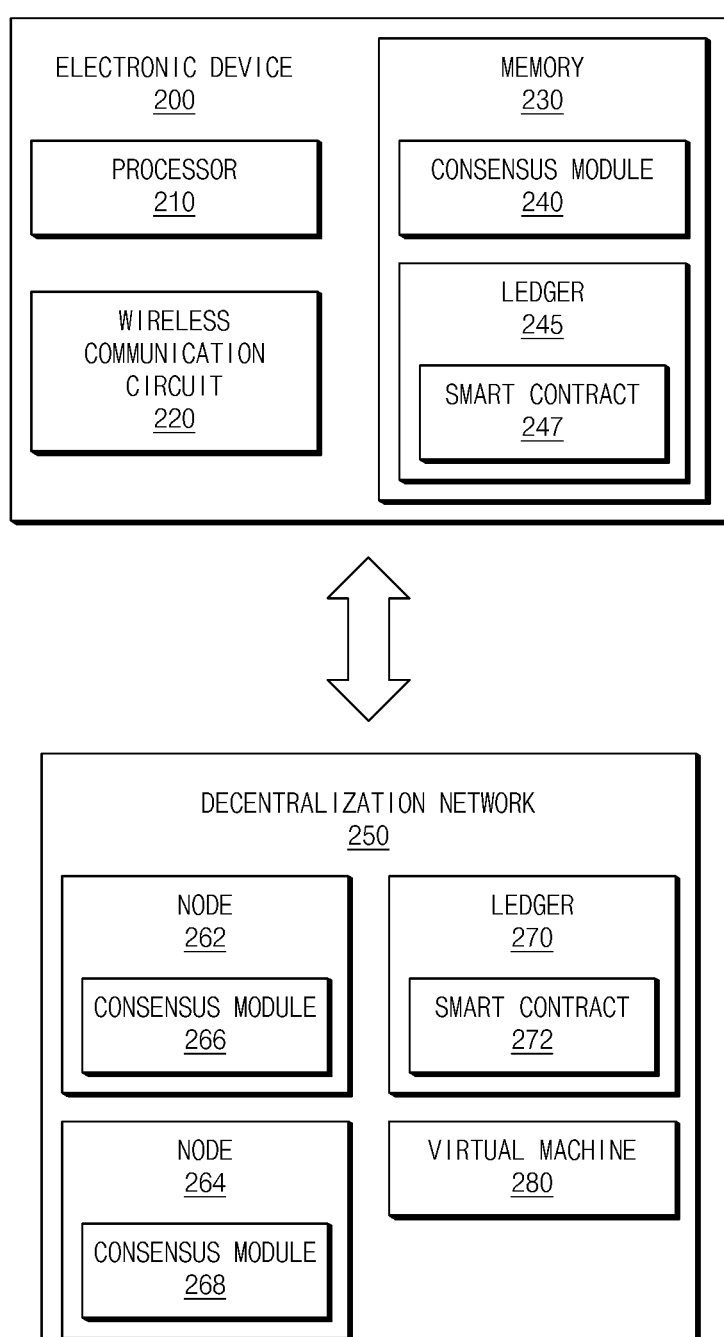
FIG. 3 illustrates a configuration of an electronic device according to one or more embodiments.
Figure 4:
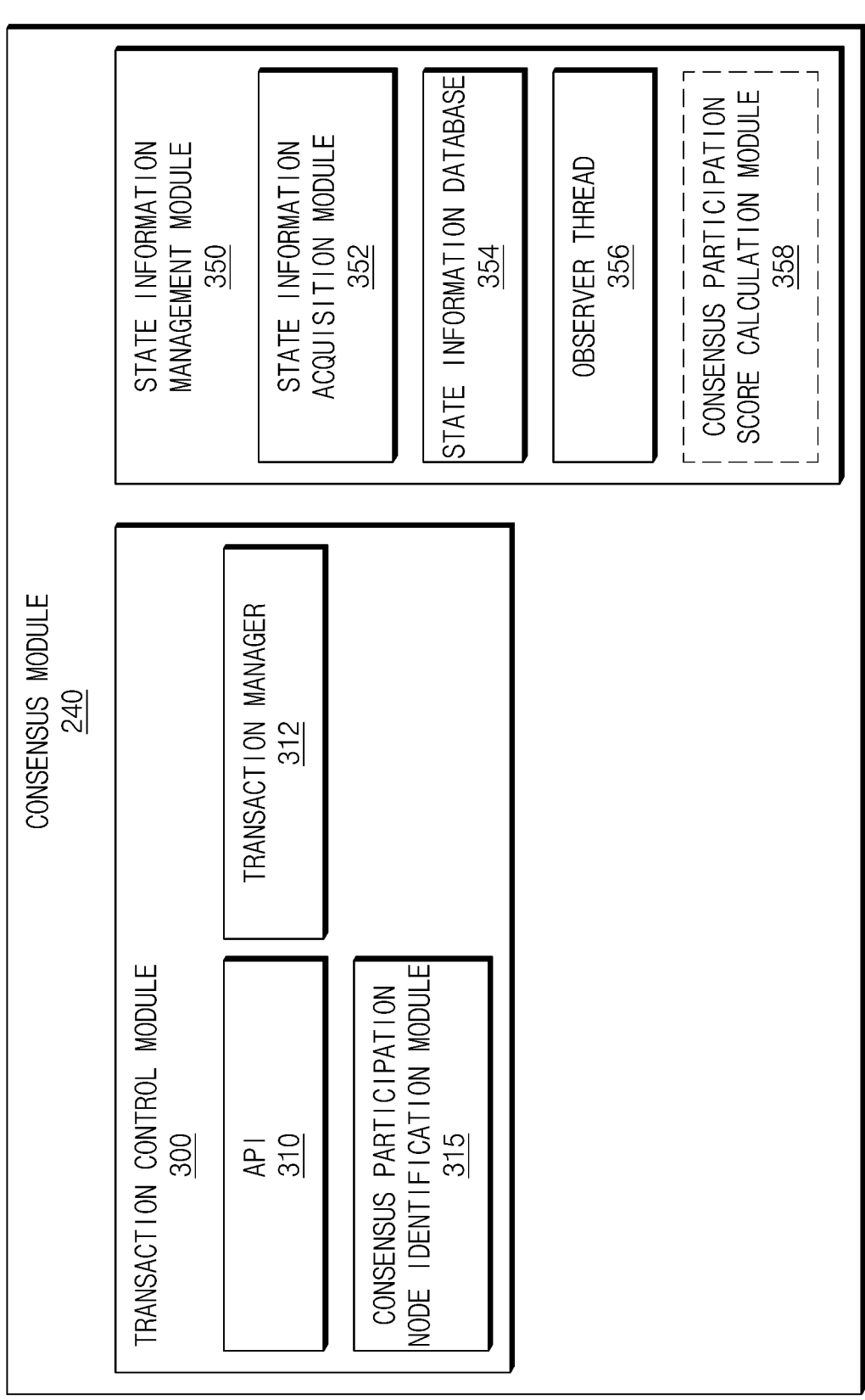
FIG. 4 illustrates a configuration of a consensus module according to one or more embodiments.

FIG. 2 illustrates a decentralization network according to one or more embodiments. FIG. 3 illustrates a configuration of an electronic device according to one or more embodiments. FIG. 4 illustrates a configuration of a consensus module according to one or more embodiments. FIG. 5 illustrates a consensus participation score calculation table according to one or more embodiments.

In an embodiment, a decentralization network 250 may include an electronic device 200 and one or more external electronic devices 251, 252, 253, 254, 255, 256, and 257.

In an embodiment, the electronic device 200 and the one or more external electronic devices 251, 252, 253, 254, 255, 256, and 257 may be electronic devices capable of being carried by a user (or having high mobility). In an embodiment, the electronic device 200 and the one or more external electronic devices 251, 252, 253, 254, 255, 256, and 257 may include a portable communication device (e.g., a smartphone), a computer device, a notebook, a netbook, a laptop, a tablet PC, a portable multimedia device, a portable medical device, or a wearable device.

In an embodiment, the decentralization network 250 may be a peer-to-peer (P2P) network based on a blockchain technology. In an embodiment, the decentralization network 250 may be slower in processing (e.g., transaction and/or block generation) speed than a decentralization network based on a server (e.g., a server 108 of FIG. 1). To supplement it, a consensus algorithm according to one or more embodiments may be implemented.

In an embodiment, the electronic device 200 and the one or more external electronic devices 251, 252, 253, 254, 255, 256, and 257 may operate as nodes in the decentralization network 250. For example, the electronic device 200 and the one or more external electronic devices 251, 252, 253, 254, 255, 256, and 257 may operate as leader nodes or follow nodes. The leader node may generate a transaction and may request consensus about the transaction from at least some of the follow nodes. At least some of the follow nodes may participate in consensus. Hereinafter, for convenience of description, it is assumed that the electronic device 200 is the leader node and the one or more external electronic devices 251, 252, 253, 254, 255, 256, and 257 are the follow nodes. This is illustrative, and after the transaction is generated, the electronic device 200 may operate as the follow node.

Referring to FIG. 3, the electronic device 200 may include a processor 210 (e.g., a processor 120 of FIG. 1), a wireless communication circuit 220 (e.g., a communication module 190 of FIG. 1), and/or a memory 230 (e.g., a memory 130 of FIG. 1).

In an embodiment, the memory 230 may store a consensus module 240 and/or a ledger 245.

In the embodiment, the consensus module 240 may perform a consensus mechanism. In an embodiment, the consensus mechanism may be based on at least one consensus algorithm (e.g., a proof of stake (PoS), a proof of work (PoW), a delegated proof of stake (DPoS), or practical byzantine fault tolerance (PBFT)).

In an embodiment, the ledger 245 may include a smart contract 247. In an embodiment, the ledger 245 may be the same as a ledger 270. In an embodiment, the ledger 245 may include information about at least some of a plurality of blocks of the ledger 270.

In an embodiment, the ledger 245 may have a data structure in which the plurality of blocks are connected with each other. In an embodiment, each of the plurality of blocks may include information (e.g., a hash value) of a previous block to have a data structure in which the plurality of blocks are connected with each other. In an embodiment, each of the plurality of blocks may include a plurality of transactions.

In an embodiment, the smart contract 247 may be the same as a smart contract 272. In an embodiment, the smart contract 247 may be one of a plurality of smart contracts of the ledger 270. In an embodiment, the smart contract 247 may be one type of the transaction.

The decentralization network 250 (e.g., an Ethereum network) may be composed of a plurality of nodes 262 and 264, the ledger 270, and/or a virtual machine 280.

In an embodiment, the plurality of nodes 262 and 264 (e.g., the one or more external electronic devices 251, 252, 253, 254, 255, 256, and 257) may be electronic devices capable of performing calculation for a consensus algorithm (e.g., a proof of stake (PoS), a proof of work (PoW), a delegated proof of stake (DPoS), or practical byzantine fault tolerance (PBFT)) used in the decentralization network 250. In an embodiment, some of all the nodes 262 and 264 which are participating in the decentralization network 250 may fail to participate in the consensus algorithm. In an embodiment, a configuration of each of the plurality of nodes 262 and 264 may be the same as the configuration of the electronic device 200.

In an embodiment, the plurality of nodes 262 and 264 may have consensus modules 266 and 268, respectively. The consensus modules 266 and 268 may be the same as the consensus module 240 of the electronic device 200 or may perform the same function as the consensus module 240 of the electronic device 200.

In an embodiment, the ledger 270 may have a data structure in which a plurality of blocks are connected with each other. In an embodiment, each of the plurality of blocks may include information (e.g., a hash value) of a previous block to have a data structure in which the plurality of blocks are connected with each other. In an embodiment, each of the plurality of blocks may include a plurality of transactions.

In an embodiment, the transaction may be a message signed by a specified type of account (e.g., an externally owned account (EOA)). In an embodiment, the transaction may include a property value (e.g., nonce), a processing cost (e.g., gasPrice or gasLimit), a destination account, an amount of remittance, a payload (or data), a signature (e.g., a signature according to an elliptic curve digital signature algorithm (ECDSA)), or a combination thereof.

In an embodiment, the ledger 270 may be shared by the nodes 262 and 264. In an embodiment, some of the nodes 262 and 264 may store only a portion of the ledger 270.

In an embodiment, the smart contract 272 may include a program code executable through the virtual machine 280. In an embodiment, the smart contract 272 may be one type of the transaction.

In an embodiment, the virtual machine 280 (e.g., an Ethereum virtual machine (EVM)) may be a virtual machine which performs calculation for a change in state (e.g., an update of the ledger 270) in the decentralization network 250 or execution of the smart contract 272. In an embodiment, the virtual machine 280 may be a machine based on calculation performed by the plurality of nodes 262 and 264. In an embodiment, the latest state of the virtual machine 280 may be shared by the plurality of nodes 262 and 264.

Referring to FIG. 4, the consensus module 240 may be composed of a transaction control module 300 and/or a state information management module 350. In an embodiment, the consensus modules 266 and 268 may be the same as the consensus module 240 or may perform the same function as the consensus module 240.

In an embodiment, the transaction control module 300 may include an application programming interface (API) 310, a transaction manager 312, and/or a consensus participation node identification module 315.

The API 310 may include at least one instruction (e.g., a get valid node, a response valid node, a determine valid node, a request transaction, a confirm transaction, a request update block, and/or an execute update block) for identifying a node to participate in consensus of the transaction.

The transaction manager 312 may interwork with the ledger 245 to monitor the generation of a transaction and may manage the consensus participation node identification module 315 and the state information management module 350. For example, when the electronic device 200 operates as a leader node, the transaction manager 312 may identify a consensus participation node using the consensus participation node identification module 315. For example, when the electronic device 200 operates as a follow node, the transaction manager 312 may request state information from the state information management module 350.

The consensus participation node identification module 315 may identify a consensus participation node (e.g., a second external electronic device) based on consensus participation responses received from the one or more external electronic devices 251, 252, 253, 254, 255, 256, and 257.

In an embodiment, the state information management module 350 may include a state information acquisition module 352, a state information database 354, an observer thread 356, and/or a consensus participation score calculation module 358. In an embodiment, the consensus participation score calculation module 358 may be omitted.

Hereinafter, it is assumed that the electronic device 200 operates as the follow node to describe the state information management module 350.

In an embodiment, the state information management module 350 may deliver state information of the electronic device 200 to the transaction manager 312 in response to the state information request of the transaction manager 312.

The state information acquisition module 352 may obtain state information of the electronic device 200 from the state information database 354. In an embodiment, the state information acquisition module 352 may obtain latest data in the state information stored in the state information database 354.

The state information database 354 may store the state information of the electronic device 200. The state information of the electronic device 200 may be measured based on a performance index and/or a stability index of the electronic device 200.

In an embodiment, the performance index may include at least one of strength of a received signal, CPU performance, memory capacity, or a packet Internet groper (ping) time. For example, the strength of the received signal may indicate strength of a signal (e.g., a received signal strength indicator (RSSI)) received by the electronic device 200. For example, the CPU performance may indicate a computational ability (e.g., 20 Hz) of a processor 210. For example, the memory capacity may indicate available random access memory (RAM) capacity (e.g., 12 GB). For example, the ping time may indicate a data transfer rate over a network.

In an embodiment, the stability index may include at least one of a service on time, remaining battery capacity, or a transaction consensus participation history. For example, the service on time may indicate a time when the electronic device 200 uses a service provided by the decentralization network 250 during a certain duration. For example, the remaining battery capacity may indicate remaining battery capacity of the electronic device 200. For example, the transaction consensus participation history may indicate the number of times that the electronic device 200 participates in consensus of a transaction generated by a leader node during the certain duration. In an embodiment, it may be understood that a node having a low number of participation in the consensus of a transaction generated by the electronic device 200 is a node having high stability in the consensus of the transaction. The electronic device 200 may identify a consensus participation node based on the consensus history of the transaction, thus preventing a node participating in the consensus of the transaction from being biased towards a specific node. The observer thread 356 may monitor state information (e.g., signal strength, CPU performance, or remaining battery capacity) of the electronic device 200. The observer thread 356 may deliver the obtained state information of the electronic device 200 to the state information database 354.

The consensus participation score calculation module 358 may calculate a consensus participation score of the electronic device 200 based on the state information of the electronic device 200.

Referring again to FIG. 2, the electronic device 200 may generate a transaction. The electronic device 200 may query the one or more external electronic devices 251, 252, 253, 254, 255, 256, and 257 whether to participate in consensus to identify nodes to participate in the consensus of the generated transaction. In an embodiment, the operation of querying whether to participate in the consensus may be performed by the consensus module 240 of the electronic device 200.

In an embodiment, the query of the electronic device 200 may include a specified condition associated with states of the one or more external electronic devices 251, 252, 253, 254, 255, 256, and 257.

In an embodiment, the electronic device 200 may receive a consensus participation response from at least one first external electronic device 252, 255, and 257 which meets the specified condition among the one or more external electronic devices 251, 252, 253, 254, 255, 256, and 257. In an embodiment, the operation of identifying whether the specified condition is met may be performed by consensus modules (e.g., the consensus modules 266 and 268) of the one or more external electronic devices 251, 252, 253, 254, 255, 256, and 257.

Hereinafter, a description will be given of the specified condition included in the query of the electronic device 200.

In an embodiment, receiving the query, the one or more external electronic devices 251, 252, 253, 254, 255, 256, and 257 may calculate a consensus participation score using the consensus participation score calculation module 358. It may be understood that at least one first external electronic device where the consensus participation score is greater than or equal to a reference value (e.g., 50) among the one or more external electronic devices 251, 252, 253, 254, 255, 256, and 257 meets the specified condition. For example, the consensus participation score may be calculated by consensus participation score calculation modules (e.g., 358) of the one or more external electronic devices 251, 252, 253, 254, 255, 256, and 257.

Referring to FIG. 5, the consensus participation score calculation module 358 may calculate a consensus participation score based on a table 500. In an embodiment, the table 500 may include at least one of a performance index (e.g., strength of a received signal, CPU performance, or RAM memory capacity) and a stability index (e.g., a service on time, remaining battery capacity, or a transaction consensus participation history). The indexes included in the table 500 are illustrative, and another index (e.g., a ping time) may be further included.

Referring to the table 500, each of the indexes may have at least one interval. A point may be assigned for each interval.

In an embodiment, priorities may be assigned to the indexes according to a degree of relevance to consensus. It may be understood that having a high point value for an index with a high priority is advantageous to participation in consensus. A point may be assigned to each index according to priorities.

In an embodiment, the consensus participation score calculation module 358 may identify point values based on the state information and may calculate the point values to calculate a consensus participation score.

For example, when the signal strength is 113 dBm (e.g., $6*4$), when the service on time is 27 months (e.g., $5*2$), when the CPU performance is 5 GHz (e.g., $4*2$), when the remaining battery capacity is 2200 (e.g., $3*1$), when the memory capacity is 6 GB (e.g., $2*2$), and when the transaction consensus participation history is 12 times (e.g., $1*4$), the consensus participation score calculation module 358 may calculate a point value corresponding to each index (e.g., $6*4+5*2+4*2+3*1+2*2+1*4$) to identify a consensus participation score (e.g., 53).

In an embodiment, when the reference value included in the query is 50, a follow node (e.g., the at least one first external electronic device 252, 255, and 257) with a consensus participation score of 53 may transmit a consensus participation response to a leader node (e.g., the electronic device 200).

Referring again to FIG. 2, the specified condition may include that at least one index is within a reference range. In an embodiment, the at least one index may include at least one of the performance indexes and at least one of the stability indexes. For example, the specified condition may include that the strength of the received signal is greater than or equal to 90 dBm and the remaining battery capacity is greater than or equal to 2000. A follow node (e.g., the at least one first external electronic device 252, 255, and 257) where the strength of the received signal is greater than or equal to 90 dBm and the remaining battery capacity is greater than or equal to 2000 may transmit a consensus participation response to the leader node (e.g., the electronic device 200).

For convenience of description, hereinafter, it is assumed that the specified condition is based on the consensus participation score.

In an embodiment, the electronic device 200 may identify a specified number of second external electronic devices (e.g., 252 and 255) among the at least one first external electronic device 252, 255, and 257 based on the consensus participation response. The specified number may be determined based on a consensus algorithm (e.g., a proof of stake (PoS), a proof of work (PoW), a delegated proof of stake (DPoS), or practical byzantine fault tolerance (PBFT)).

In an embodiment, when the specified number is identical to the number of the at least one first external electronic device 252, 255, and 257, the electronic device 200 may identify the at least one first external electronic device 252, 255, and 257 as a second external electronic device.

In an embodiment, when the number of the at least one first external electronic device 252, 255, and 257 is greater than the specified number, the electronic device 200 may identify some of the at least one first external electronic device 252, 255, and 257 as second external electronic devices based on the consensus participation score. For example, when the specified number is 2, the electronic device 200 may identify external electronic devices (e.g., 252 and 255) with a high consensus participation score among the at least one first external electronic device 252, 255, and 257 as the second external electronic devices.

In an embodiment, when some of the at least one first external electronic device identified as the consensus participation scores are identical to each other is greater than the specified number, the electronic device 200 may compare arrival times of the consensus participation response. The arrival time of the consensus participation response may be understood as a time until the consensus participation response is reached from each of the at least one first external electronic device from a time point when the electronic device 200 starts to query whether to participate in the consensus. The arrival time of the response may be stored in the memory 230. For example, the specified number may be 2, the consensus participation score of the external electronic device (e.g., 252) is higher than the consensus participation scores of the external electronic devices (e.g., 255 and 257), and the consensus participation scores of the external electronic devices (e.g., 255 and 257) may be the same as each other. In this case, the electronic device 200 may identify the external electronic device (e.g., 255) with a fast arrival time of the consensus participation response among the external electronic devices (e.g., 255 and 257) together with the external electronic device (e.g., 252) as the second external electronic devices.

In an embodiment, when the number of nodes necessary for consensus is greater than the number of the at least one first external electronic device, the electronic device 200 may query one or more external electronic devices (e.g., a plurality of nodes 262 and 264) again whether to participate in consensus. In this case, the query may include a reference value (e.g., 40) lower than a reference value (e.g., 50) included in a previous query.

In an embodiment, the electronic device 200 may repeat the above-mentioned operations until a specified number of second external electronic devices are identified.

In an embodiment, the electronic device 200 may transmit the transaction to the identified second external electronic devices (e.g., 252 and 255). The electronic device 200 may receive approval or not from the second electronic devices. In an embodiment, when ⅔ of the second external electronic devices approve the consensus of the transaction, the electronic device 200 may store the transaction in the ledger 245.

Figure 6:
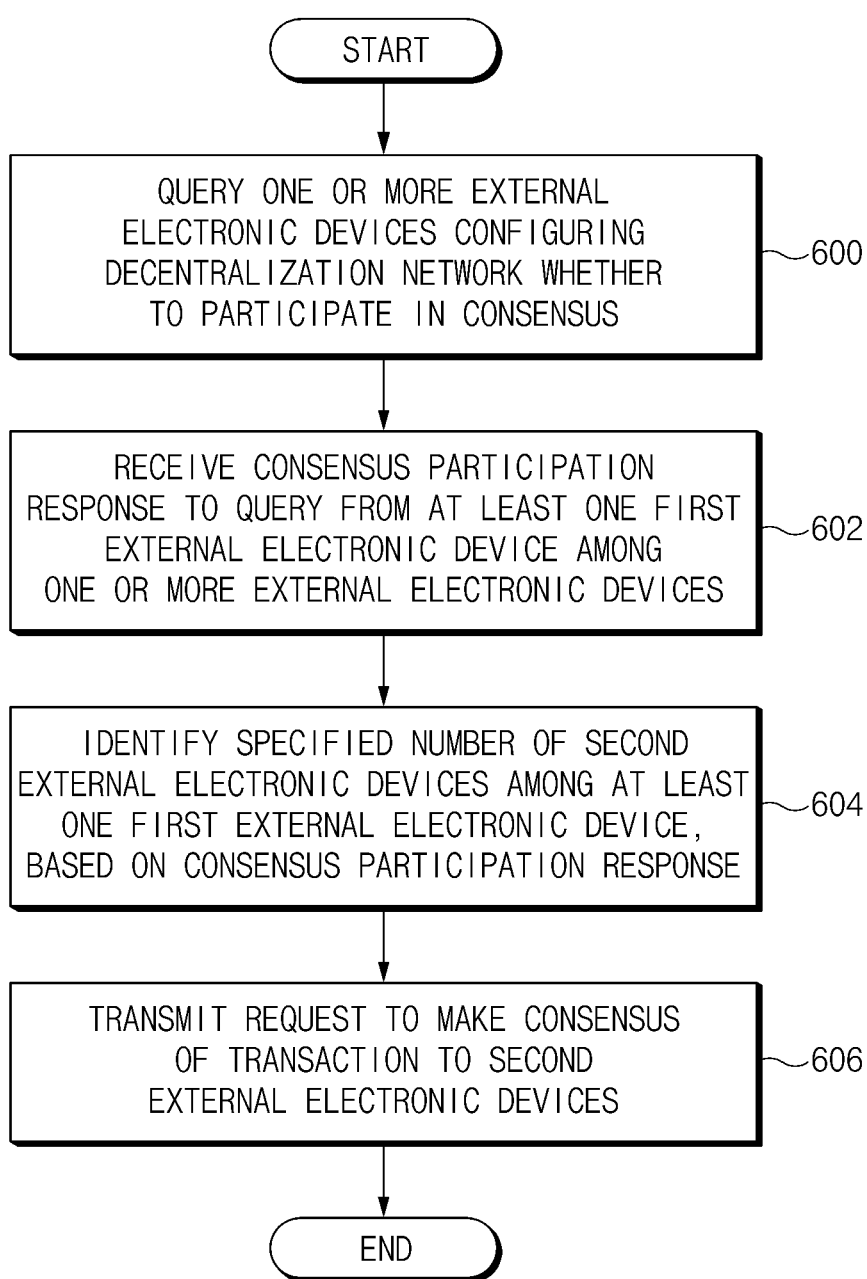
FIG. 6 is a flowchart for describing an operation of an electronic device according to one or more embodiments.

FIG. 6 is a flowchart for describing an operation of an electronic device according to one or more embodiments.

Components of FIGS. 2 to 5 may be referenced to describe FIG. 6.

In operation 600, a processor 210 may query one or more external electronic devices (e.g., 251, 252, 253, 254, 255, 256, and 257) configuring a decentralization network 250 whether to participate in consensus. In an embodiment, the query may include a specified condition associated with state information of the one or more external electronic devices. In an embodiment, the specified condition may be based on the state information of the one or more external electronic devices. In an embodiment, the state information may include at least one of a performance index or a stability index. For example, the performance index may include at least one of strength of a received signal, CPU performance, memory capacity, or a ping time. For example, the stability index may include at least one of a service on time, remaining battery capacity, or a transaction consensus participation history.

In operation 602, the processor 210 may receive a consensus participation response to the query from at least one first external electronic device among the one or more external electronic devices.

In an embodiment, the at least one first external electronic device may be understood as an external electronic device which meets the specified condition. For example, the specified condition may include that a consensus participation score calculated based on the state information is greater than or equal to a reference value. The method for calculating the consensus participation score may be referred to by the description of FIG. 5. For another example, the specified condition may include that at least one index is within a reference range.

In an embodiment, the processor 210 may store an arrival time of the consensus participation response in a memory 230.

In operation 602, a public key encryption technique may be applied to ensure security (or reliability) of information included in the consensus participation response.

In an embodiment, the processor 210 may receive public keys from one or more external electronic devices before operation 600. In an embodiment, the one or more external electronic devices may have private keys. For example, the private keys of the one or more external electronic devices may correspond to the public keys received by the processor 210, respectively.

In an embodiment, the at least one first external electronic device may encrypt (e.g., digitally sign) the information (e.g., a consensus participation score) included in the consensus participation response based on the private key.

In operation 602, the processor 210 may receive the encrypted consensus participation response from the at least one first external electronic device. In an embodiment, the processor 210 may decrypt the information included in the encrypted consensus participation response using the public key corresponding to the private key used for encryption.

In operation 604, the processor 210 may identify a specified number of second external electronic devices among the at least one first external electronic device, based on the consensus participation response. In an embodiment, the specified number may be determined based on a consensus algorithm.

In an embodiment, when the number of the at least one first external electronic device is identical to the specified number, the processor 210 may identify the at least one first external electronic device as a second external electronic device.

In an embodiment, when the number of the at least one first external electronic device is greater than the specified number, the processor 210 may identify the second external electronic device based on state information of the at least one first external electronic device and a response arrival time.

In an embodiment, when the number of the at least one first external electronic device is greater than the specified number, the processor 210 may query one or more external electronic devices whether to participate in consensus. In this case, the specified condition included in the query may be set to be different from a specified condition included in an existing query.

In operation 606, the processor 210 may transmit a request to make a consensus of the transaction to the second external electronic device. The processor 210 may receive whether to approve the transaction from the second electronic device. In an embodiment, when ⅔ of the second external electronic devices makes a consensus to generate the transaction, the processor 210 may store the transaction in a ledger 245.

In an embodiment, when the transaction is generated, the processor 210 may propagate the generation of the transaction to the one or more external electronic devices. The one or more external electronic devices may update a block stored in a ledger (e.g., 270) based on the generated transaction.

Figure 7:
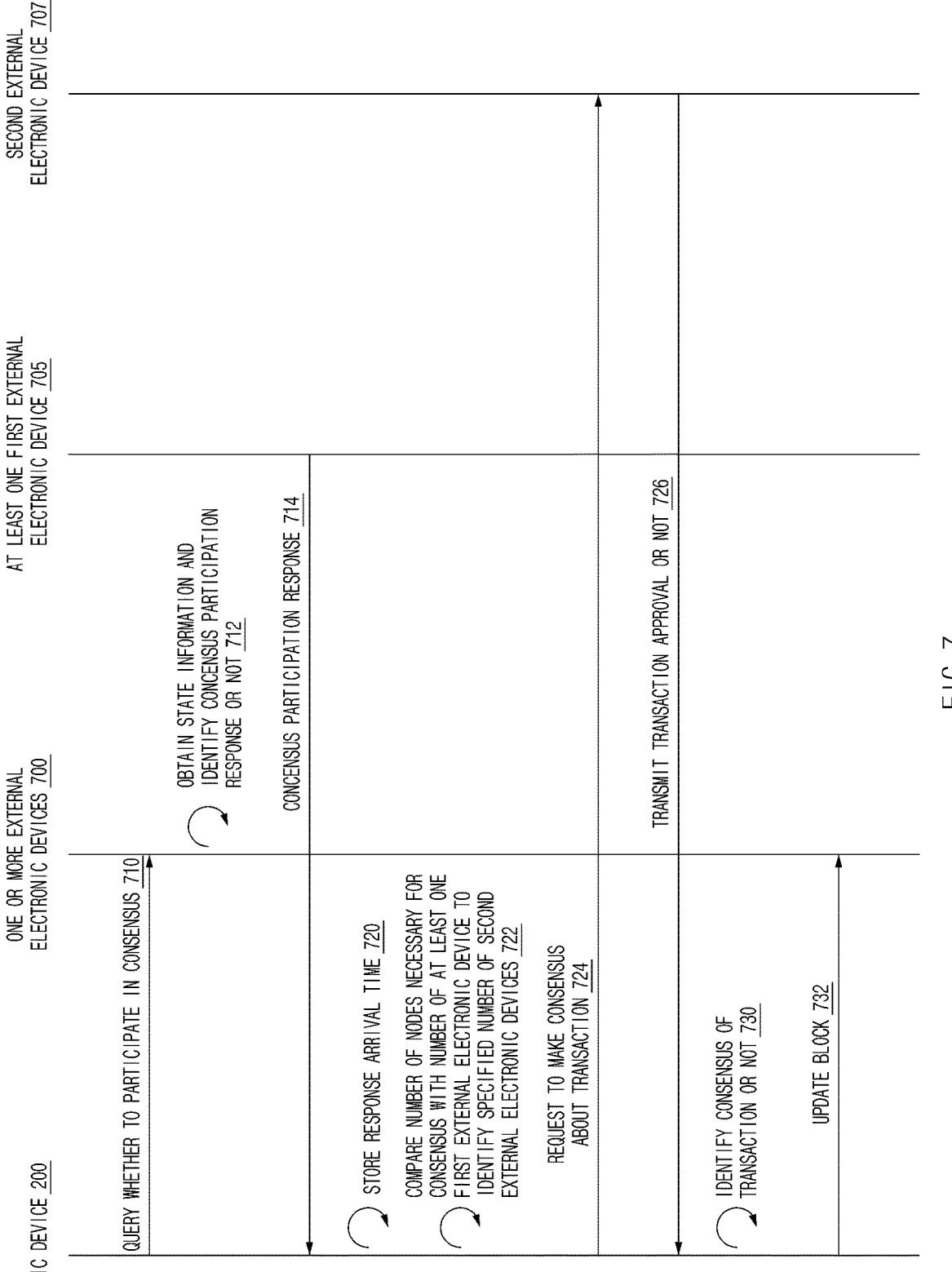
FIG. 7 is a signal sequence diagram of an electronic device according to one or more embodiments.

FIG. 7 is a signal sequence diagram of an electronic device according to one or more embodiments.

Components of FIGS. 2 to 5 may be referenced to describe FIG. 7. Hereinafter, a substantial operation of the electronic device 200 may be performed by a processor 210.

In an embodiment, the electronic device 200 and one or more external electronic devices 700 (e.g., 251, 252, 253, 254, 255, 256, and 257) may configure a decentralization network 250. In an embodiment, the electronic device 200 may operate as a leader node. In an embodiment, the one or more external electronic devices 700 may operate as follow nodes.

In an embodiment, the electronic device 200 may generate a transaction. In operation 710, the electronic device 200 may query the one or more external electronic devices 700 whether to participate in consensus.

In an embodiment, the query may include a specified condition associated with states of the one or more external electronic devices 700. In an embodiment, the states of the one or more external electronic devices 700 may be identified based on a performance index (e.g., strength of a received signal, CPU performance, RAM memory capacity, or a ping time) and/or a stability index (e.g., a service on time, remaining battery capacity, or a transaction consensus participation history).

For example, whether the specified condition is met may be determined based on a consensus participation score of each of the one or more external electronic devices 700. In this case, the query may include a reference value. For another example, whether the specified condition is met may include that at least one index of each of the one or more external electronic devices 700 is within a reference range. Hereinafter, for convenience of description, it is assumed that the specified condition is based on the consensus participation score.

In operation 712, the one or more external electronic devices 700 may obtain state information and may identify a consensus participation response or not. For example, a consensus participation score calculation module (e.g., a consensus participation score calculation module 358) of the one or more external electronic devices 700 may calculate a consensus participation score based on the state information. The one or more external electronic devices 700 may compare the calculated consensus participation score with a reference value to identify whether the specified condition is met. At least one first external electronic device 705 may be an external electronic device which meets the specified condition among the one or more external electronic devices 700.

In operation 714, the at least one first external electronic device 705 may transmit a consensus participation response to the electronic device 200.

In operation 720, the electronic device 200 may store an arrival time of the consensus participation response transmitted by the at least one first external electronic device 705.

In operation 722, the electronic device 200 may compare the number of nodes necessary for consensus with the number of the at least one first external electronic device 705 to identify a specified number of second external electronic devices 707. The specified number may be determined based on a consensus algorithm.

In an embodiment, when the number of the at least one first external electronic device 705 is greater than the number of the nodes necessary for the consensus, the electronic device 200 may identify a specified number of second external electronic devices based on the consensus participation score and the arrival time of the response.

In an embodiment, when the number of the nodes necessary for the consensus is greater than the number of the at least one first external electronic device 705, the electronic device 200 may query the one or more external electronic devices 700 again whether to participate in the consensus. In an embodiment, when the number of the nodes necessary for the consensus is the same as the number of the at least one first external electronic device 705, the at least one first external electronic device 705 may be identified as the second external electronic device 707.

In an embodiment, unlike those shown in FIG. 7, the one or more external electronic devices 700 may transmit the consensus participation score to the electronic device 200 after operation 712. When the number of the nodes necessary for the consensus is greater than the number of the at least one first external electronic device 705, the electronic device 200 may identify the at least one first external electronic device 705 as the second external electronic device 707. The electronic device 200 may further identify some of the one or more external electronic devices 700 except for the at least one first external electronic device 705 as the second external electronic device 707 based on the consensus participation score received from the one or more external electronic devices 700. For example, the electronic device 200 may further identify the second external electronic device 707 by a difference between the number of the second external electronic devices 707 and the number of the at least one first external electronic device 705. For example, the electronic device 200 may identify the second external electronic devices 707 in an order where the consensus participation score is high among the one or more external electronic devices 700 except for the at least one first external electronic device 705.

In operation 724, the electronic device 200 may request the second external electronic device 707 to make a consensus about a transaction.

In operation 726, the second external electronic device 707 may transmit whether to approve the transaction to the electronic device 200.

In an embodiment, the electronic device 200 may identify whether to make a consensus of the transaction based on approval or denial received from the second external electronic device 707. For example, when ⅔ of the second external electronic devices 707 approve the generation of the transaction, the electronic device 200 may identify that the transaction is agreed.

In an embodiment, when the transaction is agreed, the electronic device 200 may store the transaction in a ledger 245 and may propagate the generation of the transaction to the one or more external electronic device 700. The one or more external electronic devices 700 may update the block stored in the ledger 270 based on the generated transaction.

Figure 8:
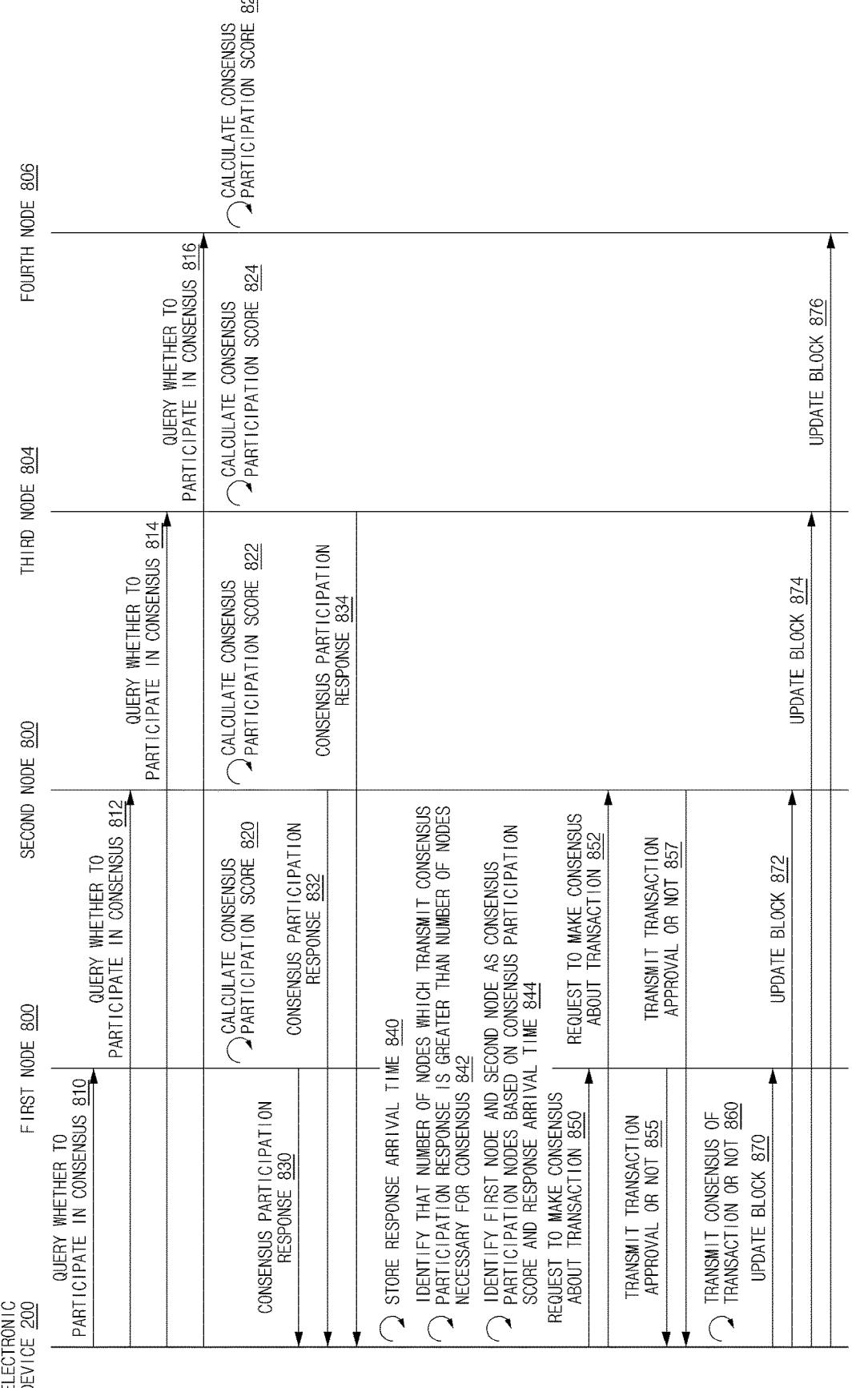
FIG. 8 is a signal sequence diagram between an electronic device and a plurality of nodes according to one or more embodiments.

FIG. 8 is a signal sequence diagram between an electronic device and a plurality of nodes according to one or more embodiments.

Components of FIGS. 2 to 5 may be referenced to describe FIG. 8. Hereinafter, a substantial operation of the electronic device 200 may be performed by a processor 210.

In an embodiment, the electronic device 200 and a plurality of nodes 800, 802, 804, and 806 may configure a decentralization network 250. In an embodiment, the electronic device 200 may operate as a leader node. In an embodiment, the plurality of nodes 800, 802, 804, and 806 may operate as follow nodes.

In an embodiment, the electronic device 200 may generate a transaction. The electronic device 200 may query the plurality of nodes 800, 802, 804, and 806 whether to participate in consensus (810, 812, 814, and 816). An API 310 may provide an instruction (e.g., getValidNode( )) for performing operations 810, 812, 814, and 816.

In an embodiment, the plurality of nodes 800, 802, 804, and 806 may calculate a consensus participation score based on state information (820, 822, 824, and 826). The API 310 may provide an instruction (e.g., CallMyPoints( )) for performing operations 820, 822, 824, and 826.

In an embodiment, at least one node 800, 802, and 804 (e.g., at least one first external electronic device) where the consensus participation score is greater than or equal to a reference value among the plurality of nodes 800, 802, 804, and 806 may transmit a consensus participation response to the electronic device 200 (830, 832, 834). The API 310 may provide an instruction (e.g., responseValidNode( )) for performing operations 830, 832, and 834.

In operation 840, the electronic device 200 may store an arrival time of the consensus participation response transmitted by the at least one node 800, 802, and 804. The API 310 may provide an instruction (e.g., SaveResponseTimeForEachNoode( )) for performing operations 840.

In an embodiment, the electronic device 200 may identify that the number (3) of nodes which transmit the consensus participation response is greater than the number (2) of nodes necessary for consensus. The API 310 may provide an instruction (e.g., checkNodeNumIsEqualToReqNum( )) for performing operations 842.

In operation 844, the electronic device 200 may identify the first node 800 and the second node 802 as consensus participation nodes (e.g., the second external electronic devices) based on the consensus participation score and the response arrival time of the at least one node 800, 802, and 804. The API 310 may provide an instruction (e.g., getBigPointgsNum and/or getFasterResponseTimeNodeList) for performing operations 844.

For example, the consensus participation score of the first node 800 may be higher than consensus participation scores of the second node 802 and the third node 804. The consensus participation scores of the second node 802 and the third node 804 may be the same as each other. The electronic device 200 may identify the first node 800 with a high consensus participation score as a consensus participation node.

For example, the response arrival time of the second node 802 may be shorter than a response arrival time of the third node 804. The electronic device 200 may compare the response arrival times of the second node 802 and the third node 804 to identify the second node 802 with a short time together with the first node 800 as consensus participation nodes.

In an embodiment, the electronic device 200 may request the consensus participation nodes 802 and 804 to make a consensus about a transaction. The API 310 may provide an instruction (e.g., requestTxconfirm( )) for performing operations 850, and 852.

In an embodiment, the consensus participation nodes 802 and 804 may transmit whether to approve the generation of the transaction to the electronic device 200 (855 and 857). The API 310 may provide an instruction (e.g., responseOpinionForTX( )) for performing operations 855 and 857.

In operation 860, the electronic device 200 may identify whether to make a consensus of the transaction. The API 310 may provide an instruction (e.g., decideIfTxconfimIs( )) for performing operation 860.

In an embodiment, the electronic device 200 may propagate the generation of the transaction to the plurality of nodes 800, 802, 804, and 806. The plurality of nodes 800, 802, 804, 806 may update a block based on the generated transaction (870, 872, 874, and 876). The API 310 may provide an instruction (e.g., updateBlock( )) for performing operations 870, 872, 874, and 876.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

What is claimed is:

1. An electronic device, comprising:
a wireless communication circuit;
memory storing at least one instruction;
at least one processor configured to execute the at least one instruction to:
query external electronic devices included in a decentralization network whether to participate in a consensus, receive, from a plurality of first external electronic devices among the external electronic devices, a consensus participation response to the query that indicates whether a specified condition associated with state information of the plurality of external electronic devices is met, identify a specified number of second external electronic devices among the plurality of first external electronic devices, based on the consensus participation response, transmit, before the specified number of second external electronic devices start computations for performing the consensus, a consensus request, to the specified number of second external electronic devices, and change the specified condition and query the external electronic devices again whether to participate in the consensus, based on a number of the plurality of first external electronic devices being less than the specified number.

2. The electronic device of claim 1, wherein the plurality of first external electronic devices participates in the consensus based on whether the specified condition is met.

3. The electronic device of claim 2, wherein the state information is based on at least one of a performance index or a stability index of each of the at least one external electronic devices.

4. The electronic device of claim 3, wherein the performance index comprises at least one of strength of a received signal, CPU performance, memory capacity, or a packet Internet groper (ping) time, and wherein the stability index comprises at least one of a service on time, remaining battery capacity, or a transaction consensus participation history.

5. The electronic device of claim 4, wherein the specified condition comprises that a consensus participation score calculated based on the state information is greater than or equal to a reference value.

6. The electronic device of claim 4, wherein the specified condition comprises that at least one index included in the performance index and the stability index is within a reference range.

7. The electronic device of claim 2, wherein the at least one processor is further configured to execute the at least one instruction to:

identify the specified number of second external electronic devices, based on at least one of the state information or an arrival time of the consensus participation response, based on a number of the plurality of first external electronic devices being greater than the specified number.

8. The electronic device of claim 1, wherein the specified number is determined based on a consensus algorithm.

9. The electronic device of claim 8, wherein the consensus algorithm comprises at least one of a proof of stake (POS), a proof of work (PoW), a delegated proof of stake (DPoS), or practical byzantine fault tolerance (PBFT).

10. A method of operating an electronic device, comprising:

querying external electronic devices included in a decentralization network whether to participate in a consensus;

receiving, from a plurality of first external electronic devices among the external electronic devices, a consensus participation response to the query that indicates whether a specified condition associated with state information of the plurality of external electronic devices is met;

identifying a specified number of second external electronic devices among the plurality of first external electronic device, based on the consensus participation response;

transmitting, before the specified number of second external electronic devices start computations for performing the consensus, a consensus request to the specified number of second external electronic devices; and changing the specified condition and querying the external electronic devices again whether to participate in the consensus, based on a number of the plurality of first external electronic devices being less than the specified number.

11. The method of claim 10, wherein the plurality of first external electronic devices participates in the consensus based on whether the specified condition is met.

12. The method of claim 11, wherein the state information is based on at least one of a performance index or a stability index of each of the external electronic devices.

13. The method of claim 12, wherein the performance index comprises at least one of strength of a received signal, CPU performance, memory capacity, or a packet Internet groper (ping) time, and wherein the stability index comprises at least one of a service on time, remaining battery capacity, or a transaction consensus participation history.

14. The method of claim 13, wherein the specified condition comprises that a consensus participation score calculated based on the state information is greater than or equal to a reference value.

15. The method of claim 13, wherein the specified condition comprises that at least one index included in the performance index and the stability index is within a reference range.

16. The method of claim 11, further comprising:

identifying the specified number of second external electronic devices, based on at least one of the state information or an arrival time of the consensus participation response, based on a number of the plurality of first external electronic devices being greater than the specified number.

17. The method of claim 10, wherein the specified number is determined based on a consensus algorithm.

18. The method of claim 17, wherein the consensus algorithm comprises at least one of a proof of stake (POS), a proof of work (PoW), a delegated proof of stake (DPoS), or practical byzantine fault tolerance (PBFT).

* * * * *